US009248521B2

United States Patent
Bray

(10) Patent No.: US 9,248,521 B2
(45) Date of Patent: Feb. 2, 2016

(54) METHOD OF LINEAR FRICTION WELDING

(75) Inventor: Simon E Bray, Derby (GB)

(73) Assignee: ROLLS-ROYCE plc, London (GB)

( * ) Notice: Subject to any disclaimer, the term of this patent is extended or adjusted under 35 U.S.C. 154(b) by 654 days.

(21) Appl. No.: 13/535,861

(22) Filed: Jun. 28, 2012

(65) Prior Publication Data

US 2013/0011681 A1   Jan. 10, 2013

(30) Foreign Application Priority Data

Jul. 5, 2011   (GB) .................................. 1111428.7

(51) Int. Cl.
  *B32B 37/00* (2006.01)
  *B23K 20/12* (2006.01)
  *B29C 65/06* (2006.01)

(52) U.S. Cl.
  CPC ............. B23K 20/1205 (2013.01); B29C 65/06 (2013.01); *Y10T 428/31504* (2015.04)

(58) Field of Classification Search
  CPC .. B23K 20/1205; B23K 20/121; B29C 65/06; B29C 65/0618
  USPC ...................... 156/64, 73.5, 73.6, 580; 264/68
  See application file for complete search history.

(56) References Cited

U.S. PATENT DOCUMENTS 6,730,182 B2 * 5/2004 Yamazaki et al. ............ 156/73.5
7,520,308 B2 * 4/2009 Siegler et al. ................. 156/359

FOREIGN PATENT DOCUMENTS

CN   101367156 A   2/2009
EP   1 447 167 A1   8/2004
GB   1 481 215      7/1977

OTHER PUBLICATIONS

Search Report issued in British Application No. 1111428.7 dated Jul. 28, 2011.

* cited by examiner

*Primary Examiner* — James Sells
(74) *Attorney, Agent, or Firm* — Oliff PLC

(57) ABSTRACT

A method of linear friction welding, the method comprising: a friction phase comprising oscillating a first workpiece (2) relative to a second workpiece (4) with a surface of the first workpiece (2) being forced against a surface of the second workpiece (4), such that a plasticised layer is formed at the interface between the first and second workpieces (2, 4); wherein the friction phase is divided into a plurality of sub-phases, each sub-phase being configured to form a plasticized layer at the interface between the first and second workpieces (2, 4), each plasticized layer comprising a stagnation zone (10*a*, 10*b*); wherein the stagnation zone (10*a*) of one sub-phase is offset from the stagnation zone (10*b*) of another sub-phase.

14 Claims, 2 Drawing Sheets

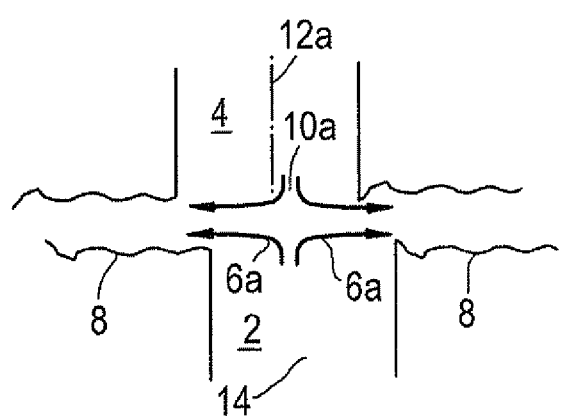
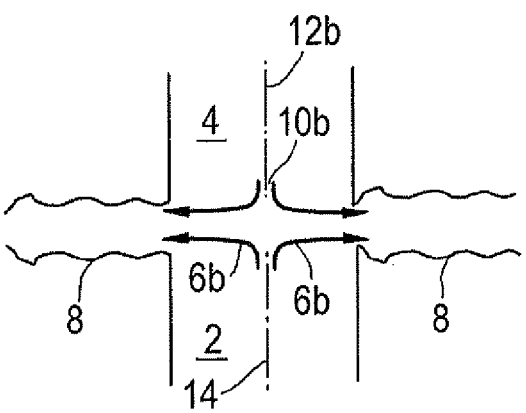
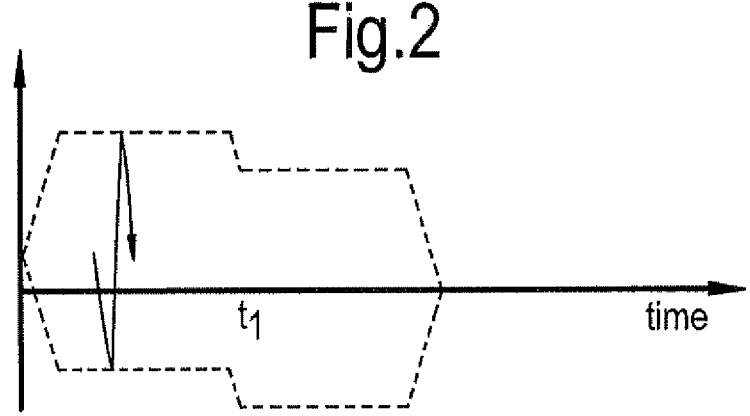
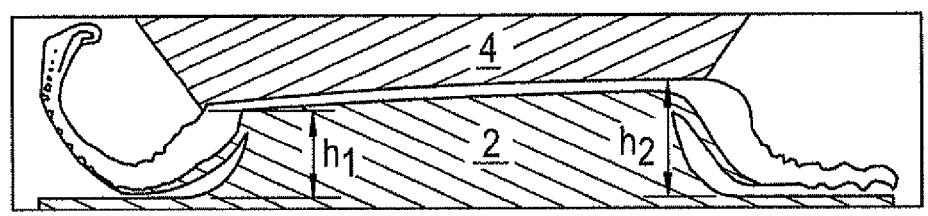

METHOD OF LINEAR FRICTION WELDING

The present invention relates to a method of linear friction welding and particularly, but not exclusively, to a method which eliminates contaminants from the weld.

Linear friction welding (LFW) is a solid-state joining process in which materials are joined using frictional heat created by relative linear motion (oscillation) between two workpieces under a compressive load. LFW produces high-integrity, repeatable welds in a short time.

As LFW (and other friction welding techniques) is a solid-state process, the weld is formed at a temperature which is below the melting point of the material. Accordingly, in contrast to fusion welding processes, no molten material is generated during LFW. Consequently, LFW alleviates several problems associated with fusion welding processes and the molten pool which these create. For example, LFW produces welds with no porosity, low solidification shrinkage and low distortion.

In the LFW process, the first workpiece is held in a stationary chuck and the second workpiece is held in an oscillating chuck. The oscillating chuck oscillates the second workpiece relative to the first workpiece and the surfaces of the workpieces are brought into contact under a low force in a first friction phase. In this phase, heat is generated between the surfaces but no material is extruded from the interface between the workpieces. In a second friction phase, the force between the workpieces is increased, such that a plasticised layer is formed at the interface between the workpieces and plastic material is extruded out of the interface. In the fourth phase, the oscillation of the second workpiece is stopped rapidly and a forging force is applied to consolidate the weld as the workpieces cool.

LFW is considered to be a self-cleaning process in that interface contaminants are ejected by plastic flow into the sacrificial weld flash under the forging and oscillation motions.

However, it has been found that a zone of (potentially contaminated) material is continually dragged back-and-forth in a pseudo-stagnation region in the centre of the weld cross-section, i.e. although the material flows it is not extruded from the interface between the workpieces.

The contaminant features may be:
atmospheric reaction products, formed at the weld interface during heating, e.g. hard alpha particles in Titanium alloys;
surface preparation contaminants, such as grinding or cutting debris, or cutting fluid residue;
handling contaminants, such as dust, lint from cleaning media, or remnant from poor cleaning procedures.

For safety critical applications of LFW, such as joining of aerofoils to discs to form Blisks in aero-engines, these contaminants may result in an undesirable fatigue deficit, with reduced component life or sudden unexpected failure.

The stagnation zone may be present in a chordal (oscillation along the long-axis direction), or tangential (oscillation in the short-axis direction) welding procedure.

The type of sub-surface contaminants that may be present are generally small and dispersed due to the mechanical grinding action of the weld oscillation, and are likely to be below the threshold level for detection by Non-Destructive Examination (NDE) techniques. Furthermore, in Blisk applications the geometry of the component does not readily lend itself to NDE methods.

To ensure sub-surface weld contaminants are removed, the welding process is typically optimised using the total upset, i.e. the amount of material extruded from the interface measured by the axial shortening of the workpieces (the upset) must achieve a minimum level. The minimum upset required to remove contaminants is usually determined by cut-up examination during process development. The experimental approach lends itself to potential optimistic findings, i.e. the quantity of weld produced may not be sufficient to find features to an acceptable statistical significance for safety critical aerospace applications. To overcome this, the target upset may be set higher, leading to some disadvantages:

excessively tall weld stubs to accommodate the higher upset level, leading to exaggerated deflections and inefficient energy transfer;

excessive amounts of weld flash formed by the increased upset which may be more problematic to remove, and will require more clearance to allow its unhindered expulsion which may compromise tooling design and performance;

reduced material utilisation, i.e. more sacrificial material on the weld stub height leading to increased material cost;

excessively long weld duration to achieve the increased upset, leading to increased machine tool wear and energy consumption.

These problems will clearly increase with larger welds (i.e. for larger weld width).

EP1555081 discloses a weld stub design which is intended to overcome this problem. The weld stub has a generally pyramidal configuration which causes the weld area to increase as the weld stub is burnt off. This configuration allows weld flash to be extruded from the weld interface and with it any contaminants, such as atmospheric reaction products. However, close control of the pyramid geometry is required with this technique, leading to increased manufacturing and inspection costs. Furthermore, this technique requires control of the weld forging force to compensate for the rapid increase in weld area as the weld stub is burnt off.

The present invention seeks to overcome these problems by providing an alternative method of removing contaminants from a linear friction weld.

In accordance with a first aspect of the invention there is provided a method of linear friction welding, the method comprising: a friction phase comprising oscillating a first workpiece relative to a second workpiece with a surface of the first workpiece being forced against a surface of the second workpiece, such that a plasticised layer is formed at the interface between the first and second workpieces. The friction phase is divided into a plurality of sub-phases, each sub-phase being configured to form a plasticised layer at the interface between the first and second workpieces. Each plasticised layer comprising a stagnation zone; wherein the stagnation zone of one sub-phase is offset from the stagnation zone of another sub-phase.

This method may ensure that weld contaminants which may be retained within the stagnation zone are eliminated from the weld interface.

This method may ensure that the required weld integrity is achieved, leading to improved component performance. It may also overcome the inherent shortcomings of NDE inspection of welds.

Each plasticised layer may comprise an extrusion zone; and the stagnation zone of one sub-phase may overlap with the extrusion zone of at least one other sub-phase.

At the extrusion zone, plastic material may be extruded out of the interface between the first and second workpieces as weld flash. In contrast, in the stagnation zone, the plastic material may flow but may not be extruded from the interface between the first and second workpieces.

The stagnation zone of said one sub-phase may be contained within the extrusion zone of said at least one other sub-phase.

The friction phase may comprise two sub-phases.

The first sub-phase may be configured to form a plasticised layer comprising a first extrusion zone and a first stagnation zone and the second sub-phase may be configured to form a plasticised layer comprising a second extrusion zone and a second stagnation zone. At least a portion of the first stagnation zone may be contained within the second extrusion zone.

Each sub-phase may oscillate the first workpiece relative to the second workpiece about a centre of oscillation which may be offset from the centre of oscillation of another sub-phase.

Each sub-phase may be determined by the geometry of the first and/or second workpieces at the interface during the sub-phase.

The first and/or second workpiece may be asymmetrical for at least one sub-phase.

The sub-phases may be determined by an asymmetrical chamfer angle of the first and/or second workpieces.

The chamfer angle may be an obtuse angle.

The first and second workpieces may be asymmetrical with respect to one another.

The plurality of sub-phases may be continuous.

The sub-phases may be carried out at different powers.

The power of a subsequent sub-phase may be lower than a power of a preceding sub-phase.

The power may be controlled using one or more of an amplitude of oscillation, a frequency of oscillation or pressure.

In accordance with another aspect of the invention there is provided a component manufactured using the method above described method. The component may be a Blisk for an aero-engine where an aerofoil is welded to a disc.

For a better understanding of the present invention, and to show more clearly how it may be carried into effect, reference will now be made, by way of example, to the accompanying drawings, in which:

FIG. 1 is a front view showing a first sub-phase (a) and a second sub-phase (b) of a method according to an embodiment of the present invention for linear friction welding two workpieces together;

FIG. 2 is a graph of amplitude against time for the oscillating workpiece;

FIG. 3 is a cross-section through a linear friction weld formed using the method of the present invention;

Figure 4A:
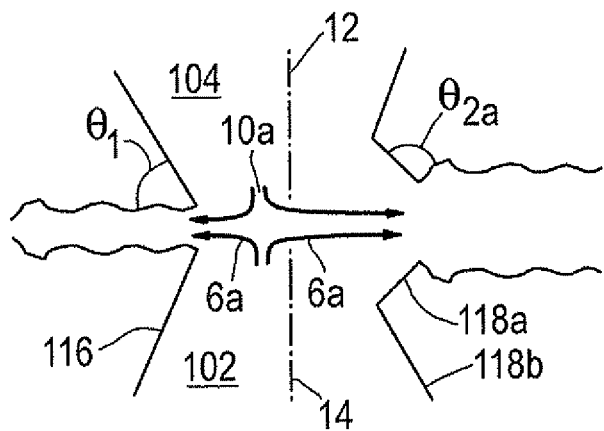
FIG. 4 is a front view showing a first sub-phase (a) and a second sub-phase (b) of a method according to another embodiment of the present invention for linear friction welding two workpieces together.

With reference to FIG. 1, there is shown a first workpiece 2 and a second workpiece 4 undergoing a LFW process according to an embodiment of the invention. The second workpiece 4 oscillates relative to the first workpiece 2 with surfaces of the first and second workpieces 2, 4 being forced against one another. The friction and heat generated by the relative movement of the first and second workpieces 2, 4 forms a plasticised layer at the interface between the first and second workpieces 2, 4.

The friction phase (corresponding to the second friction phase described previously) is divided into a first sub-phase (shown in FIG. 1(a)) and a second sub-phase (shown in FIG. 1(b)). In the first sub-phase, the plasticised layer comprises a pair of extrusion zones, indicated by arrows 6a, from which plastic material is extruded out of the interface between the first and second workpieces 2, 4 as weld flash 8. The plasticised layer further comprises a stagnation zone 10a located between the extrusion zones 6a. In the stagnation zone 10a, the plastic material flows but is not extruded from the interface between the first and second workpieces 2, 4. In the first sub-phase, the oscillation of the second workpiece 4 is centred on line 12a, which is offset from the centreline 14 of the first workpiece 2. The offset of the centre of oscillation 12a from the centreline 14 of the first workpiece 2 causes the stagnation zone 10a to be offset from the centreline 14 of the first workpiece 2 also.

In the second sub-phase, the centre of oscillation 12b of the second workpiece 4 is changed with respect to the centre of oscillation 12a of the first sub-phase. For example, the second sub-phase may have a centre of oscillation 12b which is aligned with the centreline 14 of the first workpiece 2, as shown in FIG. 1(b). It is advantageous that the second sub-phase brings the workpieces 2, 4 into alignment ready for the ramp-down and forge phase of the welding process such that post-weld machining achieves the final component geometry, however this need not be the case.

Similarly to the first sub-phase, the plasticised layer of the second sub-phase comprises a pair of extrusion zones, indicated by arrows 6b, from which plastic material is extruded out of the interface between the first and second workpieces 2, 4 as weld flash 8. The plasticised layer further comprises a stagnation zone 10b located between the extrusion zones 6b. As a result of the change in the centre of oscillation, this stagnation zone 10b is aligned with the centreline of the first workpiece 2.

As can be seen, the stagnation zone 10a of the first sub-phase is offset from the stagnation zone 10b of the second sub-phase. Accordingly, the stagnation zone 10a of the first sub-phase is contained within an extrusion zone 6b of the second sub-phase. Therefore, the plastic material which was originally in the stagnation zone 10a of the first sub-phase is extruded out of the interface between the first and second workpieces 2, 4. Similarly, the stagnation zone 10b of the second sub-phase covers a region which was in the extrusion zone 10a of the first sub-phase and hence has already been rid of any contaminants. This ensures that the entire original surface of each of the first and second workpieces 2, 4 is extruded from the interface as weld flash 8 and thus removes any contaminants which may have been present on these surfaces.

The transition between the first and second sub-phase is performed rapidly to prevent any contaminants in the stagnation zone 10a of the first sub-phase being transferred across into the stagnation zone 10b of the second sub-phase. As shown in FIG. 2, the oscillation of the second workpiece 4 has a sinusoidal profile which is offset from the centreline 14 of the first workpiece 2 during the first sub-phase. At a time, $t_1$, the transition between the first sub-phase and the second sub-phase occurs, which centres the oscillation of the second workpiece 4 on the centreline 14 of the first workpiece 2.

Due to the offset nature of the oscillation in the first sub-phase, the weld plane between the first and second workpieces 2, 4 may rotate (i.e. the level of upset is uneven across the interface). As shown in FIG. 3, the height $h_1$ of the first workpiece 2 at one side is approximately 0.2 mm less than the height $h_2$ at the other side of the first workpiece 2, resulting in a rotation of approximately 2 degrees. For tangential welding this will cause a fluctuation in the forging force, as the oscillation pushes and pulls the second workpiece 4 "up and down hill". This will require increased force to transpose the second workpiece 4 to its new centre of oscillation 12b in the second sub-phase.

To overcome this weld plane rotation, a high weld power may be employed. Using a high power reduces the thickness of the layer of plasticity, since the higher heat generated at this power extrudes more plastic material from the interface between the first and second workpieces 2, 4 per oscillation. Consequently, the total upset to remove contaminants from the interface in the first sub-phase is minimised and thus the weld plane rotation is also minimised. High power in the first sub-phase can be achieved by using a higher amplitude oscillation, higher frequency oscillation, or increased pressure, or combinations thereof. These power conditions may be maintained during the second sub-phase. Alternatively, the power may be increased or reduced in the second sub-phase. It may be difficult to alter the frequency of oscillation part-way through a weld, and hence a change in power may be more easily achieved by altering the pressure and/or the amplitude of oscillation in the transition from the first sub-phase to the second sub-phase.

Figure 4B:
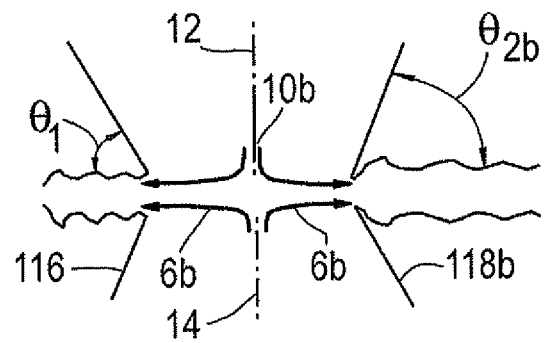

With reference to FIG. 4, there is shown a first workpiece 102 and a second workpiece 104 undergoing a LFW process according to another embodiment of the invention. As for the first embodiment, the second workpiece 104 oscillates relative to the first workpiece 102 with surfaces of the first and second workpieces 102, 104 being forced against one another. The friction and heat generated by the relative movement of the first and second workpieces 102, 104 forms a plasticised layer at the interface between the first and second workpieces 102, 104.

Again, the friction phase is divided into a first sub-phase (shown in FIG. 4($a$)) and a second sub-phase (shown in FIG. 4($b$)). However, in this embodiment the first and second sub-phases are defined by the geometry of the first and second workpieces 102, 104, with the centre of oscillation 12 of the second workpiece 104 being aligned with the centreline 14 of the first workpiece 102 during both of the first and second sub-phases.

Each of the first and second workpieces 102, 104 has a first side 116 and a second side 118. The first and second sides 116, 118 form an oblique angle with the weld plane. This angle is herein referred to as a chamfer angle, and first and second chamfer angles $\theta_1$ and $\theta_2$ are defined as the angle between the first and second sides 116, 118 and the weld plane respectively.

The second side 118 comprises first and second portions 118a, 118b which have different chamfer angles $\theta_{2a}$ and $\theta_{2b}$, which will be described in further detail below.

In the first sub-phase, the interface between the first and second workpieces 102, 104 is formed by the surface between the first side 116 and the first portion 118a of the second side 118. At this sub-phase, the geometry of each of the first and second workpieces 102, 104 is asymmetric. In other words, the first and second chamfer angles $\theta_1$ and $\theta_{2a}$ are not equal. In this embodiment, the first chamfer angle $\theta_1$ is an acute angle, whereas the second chamfer angle $\theta_{2a}$ is an obtuse angle. As a result of this asymmetry, in this embodiment of the invention the first and second workpieces have a higher thermal mass towards the second side 118 than at the first side 116.

In the first sub-phase, the plasticised layer comprises a pair of extrusion zones, indicated by arrows 6a, from which plastic material is extruded out of the interface between the first and second workpieces 102, 104 as weld flash 8. The plasticised layer further comprises a stagnation zone 10a located between the extrusion zones 6a. In the stagnation zone 10a, the plastic material flows but is not extruded from the interface between the first and second workpieces 2, 4. In the first sub-phase, the difference in thermal mass between the first and second sides 116, 118a, and the constraint imposed by the chamfer, allows plastic material to flow more easily towards the second side 118. Consequently, the stagnation zone 10a is offset from the centreline 14 towards first side 116.

In the second sub-phase, the first and second workpieces 102, 104 have been upset to the level of the second portion 118b of the second side 118. Accordingly, the first and second chamfer angles $\theta_1$ and $\theta_{2b}$ are now equal, and thus the first and second workpieces 102, 104 have symmetrical geometry.

The plasticised layer of the second sub-phase comprises a pair of extrusion zones, indicated by arrows 6b, from which plastic material is extruded out of the interface between the first and second workpieces 102, 104 as weld flash 8. The plasticised layer further comprises a stagnation zone 10b located between the extrusion zones 6b. As the geometry of the first and second workpieces 102, 104 is symmetrical in the second sub-phase, the thermal mass is uniform across the weld interface and (in contrast to the first sub-phase) no asymmetry in constraint is imposed on the flow of plastic material. Accordingly, the stagnation zone 10b is aligned with the centreline 14 of the first and second components 102, 104.

As can be seen, the stagnation zone 10a of the first sub-phase is offset from the stagnation zone 10b of the second sub-phase. Accordingly, the stagnation zone 10a of the first sub-phase is contained within an extrusion zone 6b of the second sub-phase. Therefore, the plastic material which was originally in the stagnation zone 10a of the first sub-phase is extruded out of the interface between the first and second workpieces 102, 104. Similarly, the stagnation zone 10b of the second sub-phase covers a region which was in the extrusion zone 10a of the first sub-phase and hence has already been rid of any contaminants. This ensures that the entire original surface of each of the first and second workpieces 102, 104 is extruded from the interface as weld flash 8 and thus removes any contaminants which may have been present on these surfaces.

Although the second embodiment has been described as having two distinct sub-phases, the effect of the second chamfer angle $\theta_{2a}$ on the thermal mass and constraint decreases as the first sub-phase proceeds. Hence, the stagnation zone 10a may translate towards the centreline 14 of the first and second workpieces 102, 104 during the first sub-phase itself.

Figure 5:
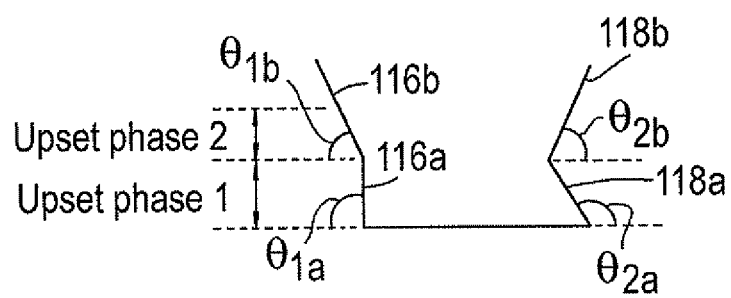
FIG. 5 is a front view of an alternative geometry for the workpieces used in the method of FIG. 4.
Figure 6:
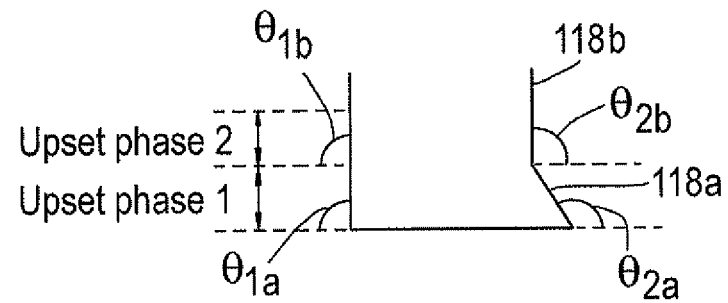
FIG. 6 is a front view of another geometry for the workpieces used in the method of FIG. 4.

FIGS. 5 and 6 show alternative geometries for the first and/or second workpieces 102, 104. In the embodiment of FIG. 5, the first side 116 also has first and second portions 116a, 116b. The chamfer angle $\theta_{1a}$ of the first portion 116a of the first side 116 is approximately 90 degrees. The chamfer angle $\theta_{2a}$ of the first portion 118a of the second side 118 is larger than the chamfer angle $\theta_{1a}$ of the first side 116, so that there is a difference in thermal mass between the first and second sides 116a, 118a. Consequently, the stagnation zone 10a is offset from the centreline 14 towards first side 116a.

In the first sub-phase of the embodiment of FIG. 6, the first side 116 has a chamfer angle $\theta_{1a}$ of approximately 90 degrees and the first portion 118a of the second side 118 has a larger chamfer angle $\theta_{2a}$. In the second sub-phase, the chamfer angle $\theta_{2b}$ of the second portion 118b of the second side 118 is reduced so that it is also approximately 90 degrees, such that the first and second sides 116, 118b are approximately parallel.

Asymmetric geometry may be used in the second sub-phase instead of, or as well as, the first sub-phase. What is required is that the stagnation zones of the sub-phases are offset from one another. Furthermore, asymmetry between the first and second workpieces may be used to provide additional control of the plastic flow.

It will be appreciated that different chamfer angles, and different combinations of chamfer angles, may be used in the first and second sub-phases as required in particular circumstances, provided that the stagnation zones of the sub-phases are offset from one another.

For both methods, the time, or upset at which the change in oscillation, or change in chamfer angle occurs will be defined by the user, but will ideally be as a function of upset for welds of differing scale.

Alternatively, if the change in oscillation or chamfer angle is more significant, then the upset required can be reduced since the contaminants in the stagnation zone during the first sub-phase will be markedly transposed away from the new stagnation zone in the second sub-phase.

Similarly, if weld parameters are altered in the transition from the first sub-phase to the second sub-phase, then different target upsets in each phase may be employed.

For larger welds, the target upset may be expected to scale with weld width.

The friction phase has been described as being divided into first and second sub-phases; however additional sub-phases may be employed. Furthermore, where more than two sub-phases are used, the initial stagnation zone may be only partially contained within an extrusion zone of another sub-phase, with the remainder of the stagnation zone being removed by way of extrusion zones of one or more additional sub-phases. In addition, it is not necessary that the stagnation zone of a sub-phase be offset from the stagnation zones of every other sub-phase.

In the first embodiment, the second workpiece 4 may have a continuously varying centre of oscillation 12 which produces a plurality of sub-phases.

Although certain angles have been referred to herein as "chamfer angles", this does not necessarily require that these angles are achieved using a chamfering process.

The present invention may be particularly useful for welding an aerofoil to a disc to form a Blisk for an aero-engine. However, the invention has applications wherever LFW is used and weld integrity is critical to component performance.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention. For example, the sub-phases may be defined by a combination of both the oscillation of the workpieces and their geometry.

The invention claimed is:

1. A method of linear friction welding, the method comprising:
    a friction phase comprising oscillating a first workpiece relative to a second workpiece with a surface of the first workpiece being forced against a surface of the second workpiece, such that a plasticised layer is formed at the interface between the first and second workpieces;
    wherein the friction phase is divided into a plurality of sub-phases, each subphase being configured to form a plasticised layer at the interface between the first and second workpieces, each plasticised layer comprising a stagnation zone; wherein the stagnation zone of one sub-phase is offset from the stagnation zone of another sub-phase.

2. A method as claimed in claim 1, wherein each plasticised layer comprises an extrusion zone; wherein the stagnation zone of one sub-phase overlaps with the extrusion zone of at least one other sub-phase.

3. A method as claimed in claim 2, wherein the stagnation zone of said one sub-phase is contained within the extrusion zone of said at least one other sub-phase.

4. A method as claimed in claim 1 wherein the friction phase comprises two sub-phases.

5. A method as claimed in claim 4, wherein the first sub-phase is configured to form a plasticised layer comprising a first extrusion zone and a first stagnation zone and the second sub-phase is configured to form a plasticised layer comprising a second extrusion zone and a second stagnation zone; wherein at least a portion of the first stagnation zone is contained within the second extrusion zone.

6. A method as claimed in claim 1, wherein each sub-phase oscillates the first workpiece relative to the second workpiece about a centre of oscillation which is offset from the centre of oscillation of another sub-phase.

7. A method as claimed in claim 1, wherein each sub-phase is determined by the geometry of the first and/or second workpieces at the interface during the sub-phase.

8. A method as claimed in claim 7, wherein the first and/or second workpiece is asymmetrical for at least one sub-phase.

9. A method as claimed in claim 7, wherein the sub-phases are determined by an asymmetrical chamfer angle of the first and/or second workpieces.

10. A method as claimed in claim 9, wherein the chamfer angle is an obtuse angle.

11. A method as claimed in claim 7, wherein the first and second workpieces are asymmetrical with respect to one another.

12. A method as claimed in claim 1, wherein the plurality of sub-phases are continuous.

13. A method as claimed in claim 1, wherein the sub-phases are carried out at different powers.

14. A method as claimed in claim 13, wherein the power is controlled using one or more of an amplitude of oscillation, a frequency of oscillation or pressure.

* * * * *